United States Patent [19]

Beutel et al.

[11] Patent Number: 4,481,359

[45] Date of Patent: Nov. 6, 1984

[54] SILVER HALIDE EMULSION CONTAINING A PURIFIED CYSTEINE-GLUTARALDEHYDE POLYMER FRACTION AND PROCESS OF MAKING

[75] Inventors: Jacob Beutel, Wilmington, Del.; Raymond J. LeStrange, Hendersonville, N.C.

[73] Assignee: E. I. Du Pont de Nemours and Company, Wilmington, Del.

[21] Appl. No.: 336,766

[22] Filed: Jan. 4, 1982

[51] Int. Cl.$^3$ .................. C07D 277/06; C07D 513/04
[52] U.S. Cl. ...................................... 546/114; 546/10; 548/101; 548/200; 430/487; 430/600
[58] Field of Search ................. 546/114, 10; 548/101, 548/200

[56] References Cited

U.S. PATENT DOCUMENTS

| | | | |
|---|---|---|---|
| 2,860,976 | 11/1958 | Spath | 96/22 |
| 3,708,302 | 1/1973 | Plakunov et al. | 96/107 |
| 3,869,289 | 3/1975 | Amering | 96/66.3 |

Primary Examiner—Henry R. Jiles
Assistant Examiner—Bernard I. Dentz

[57] ABSTRACT

From the complex reaction mixture of cysteine and glutaraldehyde a low molecular weight polymer is recovered for use as an additive to silver halide emulsions and developers to increase speed. Iron and nickel complexes of the purified low molecular weight polymer are similarly useful for silver halide emulsions.

5 Claims, 3 Drawing Figures

1 CYSTEINE / 1 GLUTARALDEHYDE

2 CYSTEINE / 1 GLUTARALDEHYDE

4 CYSTEINE / 1 GLUTARALDEHYDE

SILVER HALIDE EMULSION CONTAINING A PURIFIED CYSTEINE-GLUTARALDEHYDE POLYMER FRACTION AND PROCESS OF MAKING

BACKGROUND

1. Field of the Invention

This invention relates to photographic silver halide emulsions, and to organic compounds which increase their sensitivity without an adverse effect on fog.

2. State of the Art

Organic compounds which contain sulfur and nitrogen are widely used within the photographic art. Plakunov and Koller in U.S. Pat. No. 3,708,302 disclosed that the reaction product of cysteine and glutaraldehyde (GDA) could be employed in a layer on the same side of the support as a silver halide emulsion layer in order to improve sensitivity without adversely affecting fog. Amering in U.S. Pat. No. 3,869,289 later disclosed that the same reaction product could be employed in a photographic developer composition to increase speed. Both references teach that one should avoid having the silver halide emulsion come into intimate contact with said reaction product prior to development.

Scavron, U.S. Pat. No. 3,565,625 and Spath, U.S. Pat. No. 2,860,976 relate to the use of thiazolidines within photographic films and developers respectively, with a particularly useful moiety being thiazolidine-4-carboxylic acid (TCA). These and other references illustrate that heterocyclic compounds containing nitrogen and sulfur can be employed for a variety of purposes such as sensitization, stabilization, development and dye-formation. Therefore, a high degree of skill would be required to associate specific photographic characteristics with any particular chemical structure. While it was known that the reaction of cysteine with glutaraldehyde or a chemical equivalent thereof produced a product which could enhance the sensitivity of a silver halide film, a disadvantage connected with this technique was fog formation which was often variable. There is no disclosure in the art of how to obtain the enhanced sensitivity without increasing fog. The present invention provides that disclosure.

SUMMARY OF THE INVENTION

The object of the present invention is to provide a novel sensitizer which will either (a) increase the speed of a photographic silver halide emulsion, or (b) reduce the amount of silver used while maintaining constant photographic speed. This object is achieved by separating from a cysteine-glutaraldehyde adduct a fraction which will increase the speed of a silver halide emulsion without increasing fog, and which can be added directly to the emulsion, or developer, rather than being confined to a separate layer. This is possible because adverse fog-producing substances have been removed during the separation process. The fraction can be represented by one of the following structures:

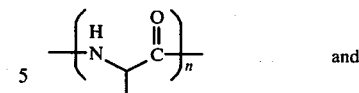

and

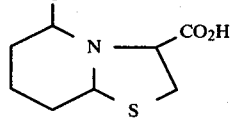

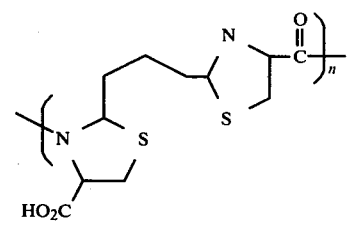

where $n = 1-10$.

When this novel sensitizer is added to silver iodobromide photographic emulsions which have been previously chemically sensitized by the usual methods of heating in the presence of sulfur and gold compounds, the photographic speed of films made from these emulsions is increased 15-30%, while the fog level remains unchanged. Also, metal ion complexes can be made of the separated fractions and can be similarly incorporated into silver halide emulsions to enhance sensitivity without increasing fog.

A preferred method of synthesis comprises forming a solution of cysteine with glutaraldehyde, in which solution cysteine is present in stoichiometric excess relative to glutaraldehyde; holding the solution at room temperature for a time sufficient to produce a yellow to amber colored reaction mixture; precipitating the reaction mixture and filtering the precipitate from solution; purifying the resulting residue by a chemical process consisting of extraction with acetic acid, washing with acetone, dissolving in water, filtration, and re-precipitation; and recovering a low molecular weight polymer. The same polymer can be recovered by substituting chromatographic separation for the purifying procedure which is described. The drawing illustrates the chromatographs obtained when the cysteine to glutaraldehyde ratio is varied from one-to-one to four-to-one.

DETAILED DESCRIPTION OF THE INVENTION

Figure 1:
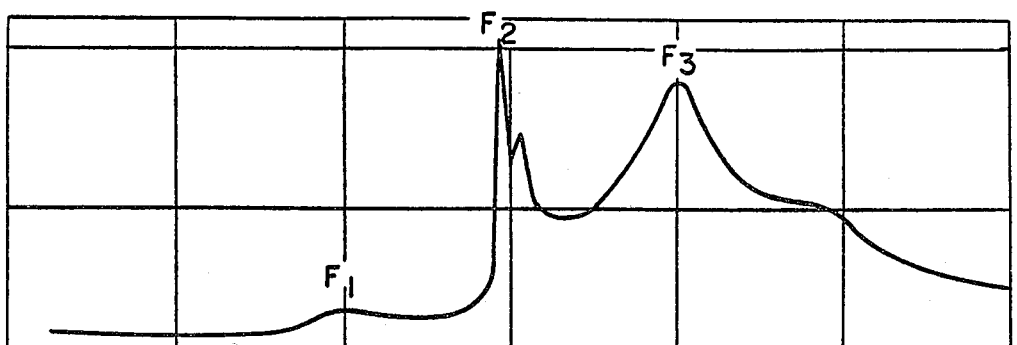
Figure 2:
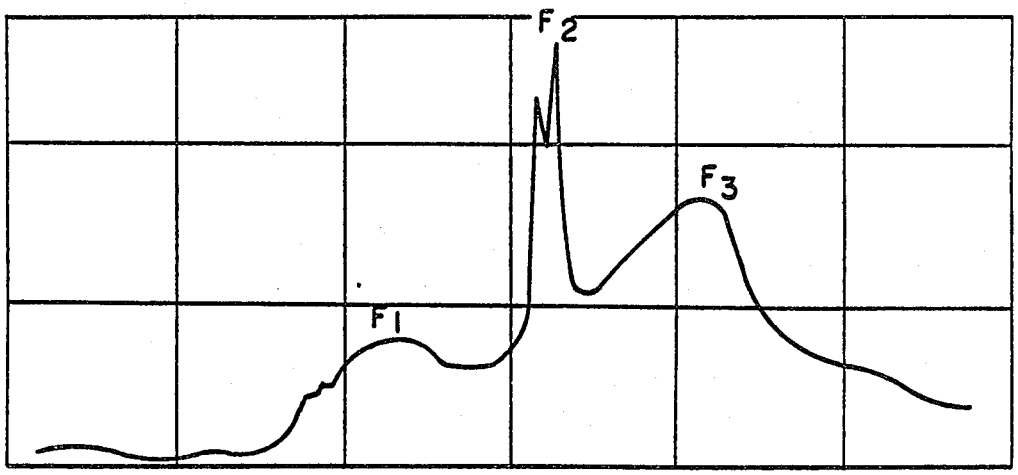
Figure 3:
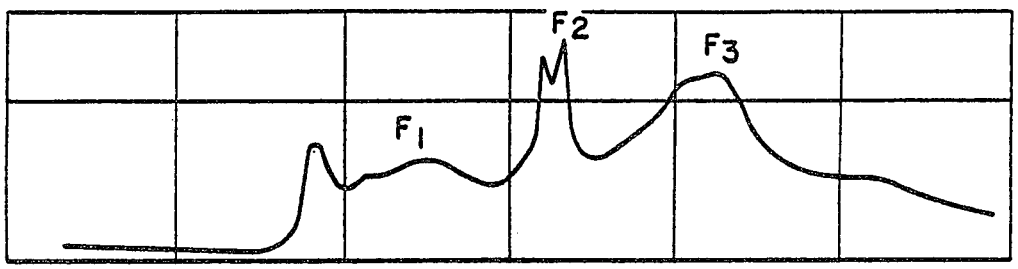

A liquid chromatography separation of a one-to-one glutaraldehyde-cysteine reaction product mixture produced three sets of fractions identified as F1, F2 and F3 in the drawings. F1 comprised about 5% of the reaction product mixture and gave a small, broad chromatographic peak. F2 gave a sharp, large, well resolved peak. F3 gave a broad, large peak. When added to a high speed silver halide emulsion, F1 increased speed without affecting fog, F2 had no sensitometric effect, while F3 increased fog without affecting speed. The chemical yield of F1 can be increased by increasing the amount of cysteine relative to GDA in the reaction.

Spectral data derived by proton NMR (nuclear magnetic resonance) and carbon 13-NMR indicate that F1 consists of a low molecular weight polymer containing cysteine- and glutaraldehyde-derived monomeric units in a two-to-one ratio. Elemental analysis of F1 confirms that its monomer molecular weight is consistent with this ratio. The spectral data further indicate that each unit contains at least one TCA moiety. Gel permeation chromatography of F1 confirms that it consists of a low molecular weight polymer containing on average, from two to six monomer units per molecule. The infrared spectrum of the purified F1 sample indicated a carboxyl peak at about 1710 $cm^{-1}$ and a broad, strong $NH_2$ or NH deformation peak at about 1600 $cm^{-1}$. The CH stretching region, 3600 to 2400 $cm^{-1}$, was broad and featureless, typical of an amino acid.

Chemical ionization mass spectroscopy produced spectra as the probe was heated from room temperature to about 300° C. Since at the end of the test, a considerable portion of the sample remained on the probe or had been carbonized, it was uncertain as to whether the actual compound was vaporized during the cycle. The spectra obtained had prominent peaks at 162, 160, 148, 104, and 90 amu. These appear to be consistent with either of the following structures which may be interconvertible (isomers of each other):

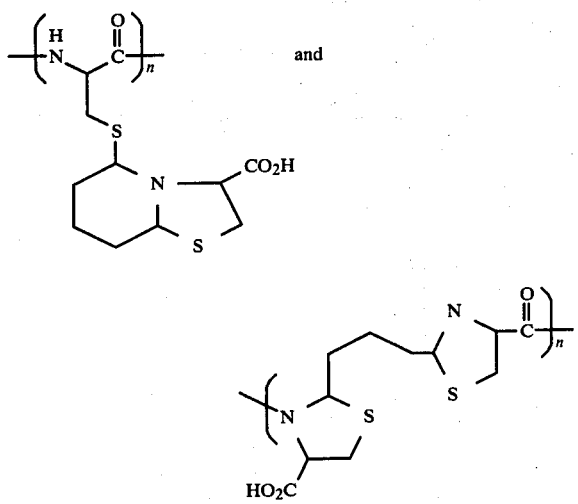

where n=1-10.

It is believed that the beneficial effect of thiazolidines within a photographic emulsion derives from their ability to complex silver ion and, thus, to adsorb to the surface of silver halide crystals. Sites at which several adjacent thiazolidine molecules are adsorbed are believed to produce the strongest effect. Having thiazolidine substituents attached to a low molecular weight polymeric backbone probably increases the likelihood of obtaining adjacently adsorbed thiazolidine molecules. The photographic effect of the adsorption of the polymer may be due to increased efficiency in trapping photocarriers produced by the absorption of actinic light during photographic exposure and/or due to acceleration of the rate of photographic development of exposed silver halide crystals to which the polymer is adsorbed.

When purified to remove by-products and unreacted reagents, the low molecular weight polymer mixture of the present invention may be further reacted with metal ions to form a metal-polymer complex. Suitable complex formation occurs by adding to purified solutions of the low molecular weight polymeric sensitizer a solution of transition metal ions having unfilled d orbitals, e.g., iron, nickel, cobalt, and copper. A wide variety of metal ions may be employed for producing the metal-polymer complex, as long as the metal ion used for complex formation does not create an adverse photographic effect within the photographic emulsion. Preferred metals are iron and nickel.

The molecular weight of the metal-polymer complex could be calculated by assigning the purified polymer a molecular weight of 306, based on the indicated structures, and proceeding on the assumption that each such molecule would complex two metal ions.

Consistent with U.S. Pat. No. 3,708,302, supra, other equivalents of cysteine, e.g., crysteine HCl can be employed in the reaction mixture with glutaraldehyde to produce the crude reaction product of the present invention. Similarly, as taught by U.S. Pat. No. 3,869,289, supra, the reaction takes place in an acid aqueous medium at room temperature over a 20 to 24 hour period, the evidence of reaction being a transition from a clear, colorless solution to a strong yellow to amber color. The mixture of reaction products can be precipitated by adding the aqueous solution to an excess of acetone and filtering under dry conditions.

Thus, while prior art investigators produced and used a cysteine-glutaraldehyde reaction mixture, they did not conceive of separating a sensitivity-enhancing first fraction from a third fraction responsible for fog formation. Because of the discovery of these novel thiazolidine-containing polymers, and their metal complexes, direct addition to photographic emulsions is now possible without prior art precautions against adverse fog effect.

As disclosed in U.S. Pat. No. 3,708,302 and U.S. Pat. No. 3,809,289 a wide range of photographic emulsions and developers may be employed in the practice of the present invention.

The following examples illustrate the practice of the present invention.

EXAMPLE 1

Synthesis

Cysteine (0.2 moles) and glutaraldehyde (0.05 moles) were dissolved with stirring in 500 ml of water in a glass bottle. The bottle was stoppered and held without stirring for 24 hours. The originally clear solution turned to a straw yellow color. 100 ml portions of the reaction mixture were each added to 1 liter of acetone until the entire batch was precipitated. The precipitate was then filtered under dry conditions to yield as the residue an off-white product which was stored over P2O5 in a desiccator. A portion of this residue was subjected to chromatographic separation.

Chromatographic Separation

A Du Pont 850 HPLC (High Performance Liquid Chromatograph) equipped with a Du Pont Zorbax-®ODS column, 25 cm long and having a 4.6 mm inside diameter was used for the separation. This is a column packed with silica particles of 5 to 10 micron particle size having a permanently adsorbed octadecylsilane phase. Operating temperature was 50° C. The mobile phase solvent A was 0.05M ammonium acetate/acetic acid buffer at pH 4.8. Solvent B was 96% methanol and 4% tetrahydrofuran. The injection amount was 100 microliters and the flow rate was 3 ml per minute.

A four step gradient program was used to achieve the separation:

(1) Zero to 18% solvent B for 3 minutes with an exponent of 4.
(2) 18% to 60% solvent B for 5 munutes with an exponent of 4.
(3) Hold at 60% B for 5 minutes.
(4) 60% B to zero % B in 1 minute.

Detection was at 270 mm at a sensitivity of 2.56 absorbance units, full scale.

Under the above conditions, the desired fraction, F1 of the present invention, elutes at a maximum of 6.2 minutes. The second peak, F2, occurs at 7.3 minutes and the last broad peak, F3, occurs at 9.8 minutes.

Emulsion Additives

A high speed gelatino-silver iodobromide emulsion (1.2% I) was gold- and sulfur-sensitized, and following digestion, final additions of stabilizers and surfactants were made for coating. Portions of this emulsion were coated on a support without other additions and served as controls, Other portions received additions as indicated in Table I. The chromatographically purified sensitizing fraction, F1, was added in aliquots of aqueous solutions.

After coating and drying, samples of the control and experimental films were exposed for 0.01 second on an EG&G sensitometer and tray processed in X-ray developer for three minutes at room temperature and then fixed, washed and dried. Results are summarized in Table I.

TABLE I

| Additive | Amount/mole AgX | Relative Speed[1] | Fog |
|---|---|---|---|
| Control | — | 100 | 0.09 |
| F1 | 0.1 mg | 140 | 0.09 |
| F1 | 0.3 mg | 150 | 0.09 |

[1] The photographic speed was measured by the relative log exposure needed to reach an optical density of 0.30.

EXAMPLE 2

Cysteine and glutaraldehyde were reacted with each other and the reaction mixture was precipitated, filtered and dried as in Example 1. Based on the premise that most of the impurities in the cysteine-GDA reaction mixture are either cysteine or cystine, the following purification method was used:

(1) A 2 g sample of the residue from the synthesis described above was washed twice with 50 ml portions of glacial acetic acid, to form a sticky light yellow paste.
(2) The acetic acid was removed by decanting and the paste was covered with 50–100 ml acetone. After being stirred for a few minutes a hard, filterable solid was obtained. This was filtered and the acetone discarded.
(3) The residue was dissolved in 100 ml water, filtered, and the filtrate then added to 1 liter of acetone. The resulting precipitate was filtered through a glass frit. This process required taking care to keep the cake wet with acetone. The final drying was done on a porous ceramic plate. As an alternate method, the precipitate was also collected by centrifuging.

About 1.2 g of a material equivalent to the chromatographically purified fraction F1 was collected. A test in the HPLC indicated that, except for a small amount of late eluting material, the purification process was successful, giving the low molecular weight polymeric sensitizer with at least 80% purity.

Metal Complex Formation

Assuming a monomer molecular weight of 306 based on the indicated chemical structure, 1 mg of purified low molecular weight polymeric sensitizer (3.3 moles) was combined with 7 moles of each of four metal ions ($Fe^{++}$, $Cu^+$, $Ni^{++}$, $Co^{++}$) in 200 ml aqueous solutions. Colorless solutions were obtained in all cases.

Emulsion Additives

A high speed gelatino-silver iodobromide emulsion (1.2% I) was gold- and sulfur-sensitized, and following digestion, final additions of stabilizers and surfactants were made for coating. Portions of this emulsion were coated on a support without other additions and served as controls. Other portions received additions as indicated in Table II. The chemically purified low molecular weight polymeric sensitizer of this invention was added in aliquots of aqueous solutions.

After coating and drying, samples of the control and experimental films were exposed for 0.01 second on an EG&G sensitometer and tray processed in X-ray developer for three minutes at room temperature and then fixed, washed and dried. Results are summarized in Table II.

TABLE II

| Additive | Relative Amount/mole AgX | Speed | Fog |
|---|---|---|---|
| Control B | — | 100 | 0.11 |
| $Fe^{++}$ complex | 0.1 mg | 141 | 0.10 |
| $Fe^{++}$ complex | 0.2 mg | 145 | 0.11 |
| $Ni^{++}$ complex | 0.1 mg | 140 | 0.14 |
| $Ni^{++}$ complex | 0.2 mg | 143 | 0.12 |
| Chemically purified sensitizer | 0.1 mg | 126 | 0.13 |

EXAMPLE 3

The synthesis was performed as in Example 1 except that instead of adding four parts of cysteine to one part of glutaraldehyde, two parts of cysteine were added to one part of glutaraldehyde, and, in another test, both were added in equal molar quantities. Lower yields were observed for the F1 fraction. The drawing shows the composite chromatographs obtained.

EXAMPLE 4

The synthesis of Example 1 was repeated except that the quantities were increased by a factor of five. Equivalent results were obtained.

EXAMPLE 5

A series of coatings was made similar to Example 1 except that a bar coating technique was used so that the emulsion coat was simultaneously overcoated with a gelatin antiabrasion layer containing hardener. As a result, films were obtained which could be processed in automatic processors instead of requiring room temperature tray processing. Table III gives comparative results when film samples were machine processed after receiving an EG&G exposure of 0.01 seconds.

TABLE III

| Amount of chemically purified sensitizer (Mole/AgX) | Fresh Results | | 2 mo. Normal Aging | |
|---|---|---|---|---|
| | Relative Speed | Fog | Relative Speed | Fog |
| Control | 100 | 0.10 | 117 | 0.10 |
| 0.040 | 127 | 0.10 | 127 | 0.11 |
| 0.067 | 131 | 0.11 | 126 | 0.12 |
| 0.133 | 136 | 0.13 | 142 | 0.13 |
| 0.265 | 154 | 0.22 | 147 | 0.19 |

EXAMPLE 6

The chemically purified low molecular weight polymeric sensitizer solid and the prepared solutions of Table IV below were stored in a freezer until needed for experiments, to avoid the gradual loss of sensitizing action which occurs when the solid or solutions are stored at room temperature for two to three weeks. Tests were run on solutions which were refrigerated to determine if at 6 weeks age there was any deterioration of sensitometric porperties. Table IV gives results.

TABLE IV

| Additive | mg/mole AgX | Relative Speed | Fog |
|---|---|---|---|
| Control | — | 100 | 0.05 |
| Freshly prepared sensitizer | 0.2 | 114 | 0.05 |
| Freshly prepared sensitizer | 0.4 | 115 | 0.08 |
| Refrigerated sensitizer solid | 0.2 | 108 | 0.05 |
| Refrigerated sensitizer solid | 0.4 | 110 | 0.05 |
| Refrigerated Fe complex | 0.2 | 105 | 0.05 |
| Refrigerated Fe complex | 0.4 | 118 | 0.06 |
| Refrigerated Ni complex | 0.2 | 108 | 0.06 |
| Refrigerated Ni complex | 0.4 | 117 | 0.06 |

Thus, the precaution of storing the solutions in a refrigerator avoids the short shelf life observed when the solutions are stored at room temperature.

EXAMPLE 7

Samples of the films of Example 4 were cooled to 0° C. and given the same exposure and processing conditions. Whereas in Table III speed increases of about 30% were obtained without adverse effects on fog, at the lower temperature the useful speed increase was 60%.

EXAMPLE 8

A standard hydroquinone/metal continuous tone X-ray developer containing, inter alia, conventional amounts of alkali buffer (sodium metaborate, sodium hydroxide), antifoggant (KBr+benzotriazole), and ethylenediamine tetraacetic acid, disodium salt, was modified by addition of 0.025 g of 5-nitroindazole per liter of developer in order to insure lower overall fog. The developer was then divided into three aliquots, to each of which additions were made as follows:

Developer A: no addition
Developer B: 0.2 g of the low molecular weight polymeric sensitizer of this invention (2 cysteine/1GDA) per liter of developer
Developer C: 0.4 g of the same low molecular weight polymeric sensitizer per liter of developer Samples of a standard medical X-ray photographic film composed of a gelatino-AgIBr (1.2%I) emulsion, gold- and sulfur-sensitized, and coated on a biaxially oriented polyethylene terephthalate film base, were exposed for 0.01 seconds on an EG&G sensitometer using a 19 line attenuator and a neutral density filter with an optical density of 2.0. Subsequently, the exposed film samples were developed in developers, A, B, and C above at room temperature, tray development. The results are summarized in Table V, below:

TABLE V

| Developer | Development Time (min) | Relative Speed | Contrast | Fog |
|---|---|---|---|---|
| A | 2 | 100 | 1.18 | 0.05 |
| A | 3 | 108 | 1.27 | 0.05 |
| B | 2 | 200 | 1.4 | 0.06 |
| B | 3 | 324 | 1.6 | 0.07 |
| C | 2 | 246 | 1.32 | 0.05 |
| C | 3 | 492 | 1.2 | 0.09 |

This example shows that additions of the low molecular weight polymeric material of this invention to developers can significantly increase development efficiency and thereby produce significant increases in the observed photographic speed at constant development time and temperature, and without a significant increase in fog.

We claim:

1. In a process for forming an adduct of cysteine with glutaraldehyde, the improvement comprising forming a solution of said compounds, in which solution cysteine is present in stoichiometric excess relative to glutaraldehyde; holding the solution at room temperature for a time sufficient to produce a yellow to amber colored reaction mixture; precipitating the reaction mixture by addition to acetone and filtering the precipitate from solution; subjecting the resulting residue to liquid chromatographic separation, whereby three low molecular weight polymer fractions, F1, F2, and F3 are eluted in that order; and recovering the F1 fraction; the aforesaid liquid chromagraphic separation being conducted in a column containing silica particles having a permanently adsorbed phase of octadecylsilane and the eluting liquid being an ammonium acetate/acetic acid buffer at pH 4.8.

2. The low molecular weight polymer fraction F1 produced by the process of claim 1.

3. In a process for forming an adduct of cysteine with glutaraldehyde, the improvement comprising forming a solution of said compounds, in which solution cysteine is present in stoichiometric excess relative to glutaraldehyde; holding the solution at room temperature for a time sufficient to produce a yellow to amber colored reaction mixture; precipitating the reaction mixture by addition to acetone and filtering the precipitate from solution; purifying the resulting residue by a chemical process consisting of extraction with acetic acid, washing with acetone, dissolving in water, filtration, and re-precipitation with acetone; and recovering a low molecular weight polymer.

4. The low molecular weight polymer produced by the process of claim 3.

5. The product of claim 4 wherein said low molecular weight polymer is an adduct of two cysteine molecules with one glutaraldehyde molecule.

* * * * *